(12) United States Patent
Wright

(10) Patent No.: US 10,792,627 B2
(45) Date of Patent: Oct. 6, 2020

(54) FLUID MIXING SYSTEMS AND METHODS

(71) Applicant: Sensia LLC, Houston, TX (US)

(72) Inventor: Stuart Fraser Wright, Battle (GB)

(73) Assignee: Sensia LLC, Houston, TX (US)

( * ) Notice: Subject to any disclaimer, the term of this patent is extended or adjusted under 35 U.S.C. 154(b) by 262 days.

(21) Appl. No.: 15/974,309

(22) Filed: May 8, 2018

(65) Prior Publication Data

US 2019/0344226 A1   Nov. 14, 2019

(51) Int. Cl.
| | | |
|---|---|---|
| B01F 5/02 | (2006.01) | |
| B01F 11/00 | (2006.01) | |
| G01N 1/38 | (2006.01) | |
| G01N 1/20 | (2006.01) | |
| B01F 13/02 | (2006.01) | |
| G01N 35/00 | (2006.01) | |

(52) U.S. Cl.
CPC ........ B01F 5/0231 (2013.01); B01F 11/0071 (2013.01); B01F 13/02 (2013.01); G01N 1/2035 (2013.01); *G01N 2001/205* (2013.01); *G01N 2035/00544* (2013.01)

(58) Field of Classification Search
CPC .... B01F 5/0231; B01F 11/0071; B01F 13/02; B01F 5/02; G01N 1/2035; G01N 2001/205; G01N 2035/00544; G01N 1/38
USPC ........................................................ 366/137
See application file for complete search history.

(56) References Cited

U.S. PATENT DOCUMENTS

| | | |
|---|---|---|
| 4,307,620 A | 12/1981 | Jiskoot |
| 4,859,071 A | 8/1989 | Woilles et al. |
| 8,469,583 B1 | 6/2013 | VanOsdol |
| 2005/0280167 A1 | 12/2005 | Hills |
| 2010/0149906 A1 | 6/2010 | Burns, II |
| 2013/0036800 A1 | 2/2013 | Mohajer |
| 2016/0346744 A1 | 12/2016 | Jiskoot et al. |

FOREIGN PATENT DOCUMENTS

| | | | |
|---|---|---|---|
| EP | 0191485 A1 | | 8/1986 |
| GB | 2357710 A | | 7/2001 |
| JP | 2003096882 A | * | 4/2003 |
| KR | 1020090028835 A | | 3/2009 |

OTHER PUBLICATIONS

International Search Report and Written Opinion dated Aug. 26, 2019, for Application No. PCT/US2019/031227.

\* cited by examiner

*Primary Examiner* — Huy Tram Nguyen
(74) *Attorney, Agent, or Firm* — Foley & Lardner LLP

(57) ABSTRACT

A jet-mixer for a fluid mixing system includes a housing including a mixer port formed in an inner surface of the housing, and a rotor rotatably disposed in the housing, the rotor including a rotor blade, wherein the rotor includes a first angular position in the housing restricting fluid flow through the mixer port, and a second angular position allowing fluid flow through the mixer port, wherein, in response to rotation of the rotor in the housing, the jet-mixer is configured to inject a first fluid jet through the mixer port into the passage of the fluid conduit that has a pulsed velocity profile.

20 Claims, 7 Drawing Sheets

FLUID MIXING SYSTEMS AND METHODS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Fluid pipeline systems may include systems for providing samples of fluid flowing therein, such as during custody transfer. Accurate sampling of the fluid flowing through the pipeline typically requires that the point from which the sample is drawn is representative of the average (quality) of the whole cross-section. Thus, sufficient mixing of the fluid flowing through the pipeline may allow accurate samples to be taken from a single point of the cross-section of the fluid pipeline. In some applications, the pipeline velocity may be adequate to provide homogeneity of fluid composition in the fluid flow via natural turbulence. However, in other applications, mixing systems may be utilized to improve the homogeneity of the fluid flow. Fluid mixing systems for pipeline applications may include static mixers, motor driven shear mixers, and jet mixers.

In-line or static mixers derive their energy from the fluid flow within the pipeline, and turbulence is created by dividing and turning the fluid. Energy added by the static mixer to the flow for mixing is generally proportional to the square of the flowrate. Generally, static mixers add more turbulence to the pipeline fluid flow as the pipeline flow rate increases. Thus, static mixers may create insufficient mixing at low pipeline flow rates and excessive pressure loss at high pipeline flow rates. Jet mixing systems may include a pump that provides an external energy source and a jet or jetting assembly that re-injects fluid back into the pipeline as part of a return loop. Unlike static mixers that may have a limited rangeability (i.e., the ratio between the maximum and minimum operating flow rates in the pipeline), jet mixers may offer improved rangeability by progressively adding more turbulence (measured in watts/kilogram, for instance) to the pipeline fluid flow as the pipeline flow rate drops.

SUMMARY

An embodiment of a jet-mixer for a fluid mixing system comprises a housing comprising a mixer port formed in an inner surface of the housing, and a rotor rotatably disposed in the housing, the rotor comprising a rotor blade, wherein the rotor comprises a first angular position in the housing restricting fluid flow through the mixer port, and a second angular position allowing fluid flow through the mixer port, wherein, in response to rotation of the rotor in the housing, the jet-mixer is configured to inject a first fluid jet through the mixer port into the passage of the fluid conduit that has a pulsed velocity profile. In some embodiments, the pulsed velocity profile comprises a plurality of velocity cycles, each velocity cycle comprising a maximum velocity, a minimum velocity, and a velocity transition extending between the maximum and minimum velocities, wherein the maximum velocity is greater than the minimum velocity. In some embodiments, the rotor comprises a first surface area that is greater than a second surface area comprising an arcuate gap formed in the rotor, and the minimum velocity for each velocity cycle of the pulsed velocity profile obtains for a greater period of time than the maximum velocity for each velocity cycle. In certain embodiments, the jet-mixer further comprises a motor coupled to the rotor, the motor configured to control the rotational speed of the rotor in the housing and thereby control a frequency of the velocity cycle of the pulsed velocity profile. In certain embodiments, the pulsed velocity profile comprises a sinusoidal velocity profile. In some embodiments, the mixer port is defined by a curved inner surface. In some embodiments, the mixer port is defined by a linear inner surface. In certain embodiments, the jet-mixer is configured to inject a second fluid jet through the mixer port into the passage of the fluid conduit that has a constant velocity profile when the rotor is held in the second angular position.

An embodiment of a fluid system for use with a fluid conduit comprises a probe that extends into a central passage of the fluid conduit through a first port of the fluid conduit, and a first conduit coupled between the probe and a jet-mixer and configured to direct a first fluid flow to the jet-mixer, wherein the first fluid flow is captured from the passage of the fluid conduit by the probe, wherein the jet-mixer is configured to receive the first fluid flow from the first conduit and inject a first fluid jet into the passage of the fluid conduit that has a pulsed velocity profile, the first fluid jet configured to mix a conduit fluid flow disposed in the passage of the fluid conduit. In some embodiments, the jet-mixer comprises a housing comprising a mixer port formed in an inner surface of the housing, and a rotor rotatably disposed in the housing, the rotor comprising a rotor blade, wherein the rotor comprises a first angular position in the housing restricting fluid flow through the mixer port, and a second angular position allowing fluid flow through the mixer port. In some embodiments, the jet-mixer is configured to inject the first fluid jet through the mixer port into the passage of the fluid conduit in response to rotation of the rotor in the housing, and the jet-mixer is configured to inject a second fluid jet through the mixer port into the passage of the fluid conduit that has a constant velocity profile when the rotor is held in the second angular position. In certain embodiments, the fluid system further comprises a fluid energizer coupled between the first conduit and the jet-mixer, wherein the fluid energizer is configured to energize the first fluid flow. In certain embodiments, the fluid energizer comprises a pump configured to pressurize the first fluid flow. In some embodiments, the pump is configured to increase fluid pressure in the housing of the jet-mixer when the rotor of the jet-mixer is disposed in the first angular position. In some embodiments, the fluid system further comprises a motor coupled to the rotor of the jet-mixer, the motor configured to control the rotational speed of the rotor in the housing. In some embodiments, the fluid system further comprises a fluid sampler coupled to the first fluid conduit and configured to capture a fluid sample from the first fluid flow.

An embodiment of a method for mixing a fluid flow in a fluid conduit comprises providing a first fluid flow to a jet-mixer from a passage of the fluid conduit, and injecting a fluid jet through a mixer port of the jet-mixer into the passage of the fluid conduit, the fluid jet having a pulsed velocity profile. In some embodiments, the method further comprises increasing a rotational speed of a rotor of the jet-mixer to thereby increase a frequency of a velocity cycle of the pulsed velocity profile, the velocity cycle comprising a maximum velocity and a minimum velocity. In some embodiments, the method further comprises pressurizing the first fluid flow provided to the jet-mixer using a pump. In certain embodiments, the method further comprises increasing an output pressure of the pump to thereby increase the energy imparted to fluid in the fluid conduit from the fluid jet.

BRIEF DESCRIPTION OF THE DRAWINGS

For a detailed description of exemplary embodiments, reference will now be made to the accompanying drawings in which.

DETAILED DESCRIPTION

Figure 1:
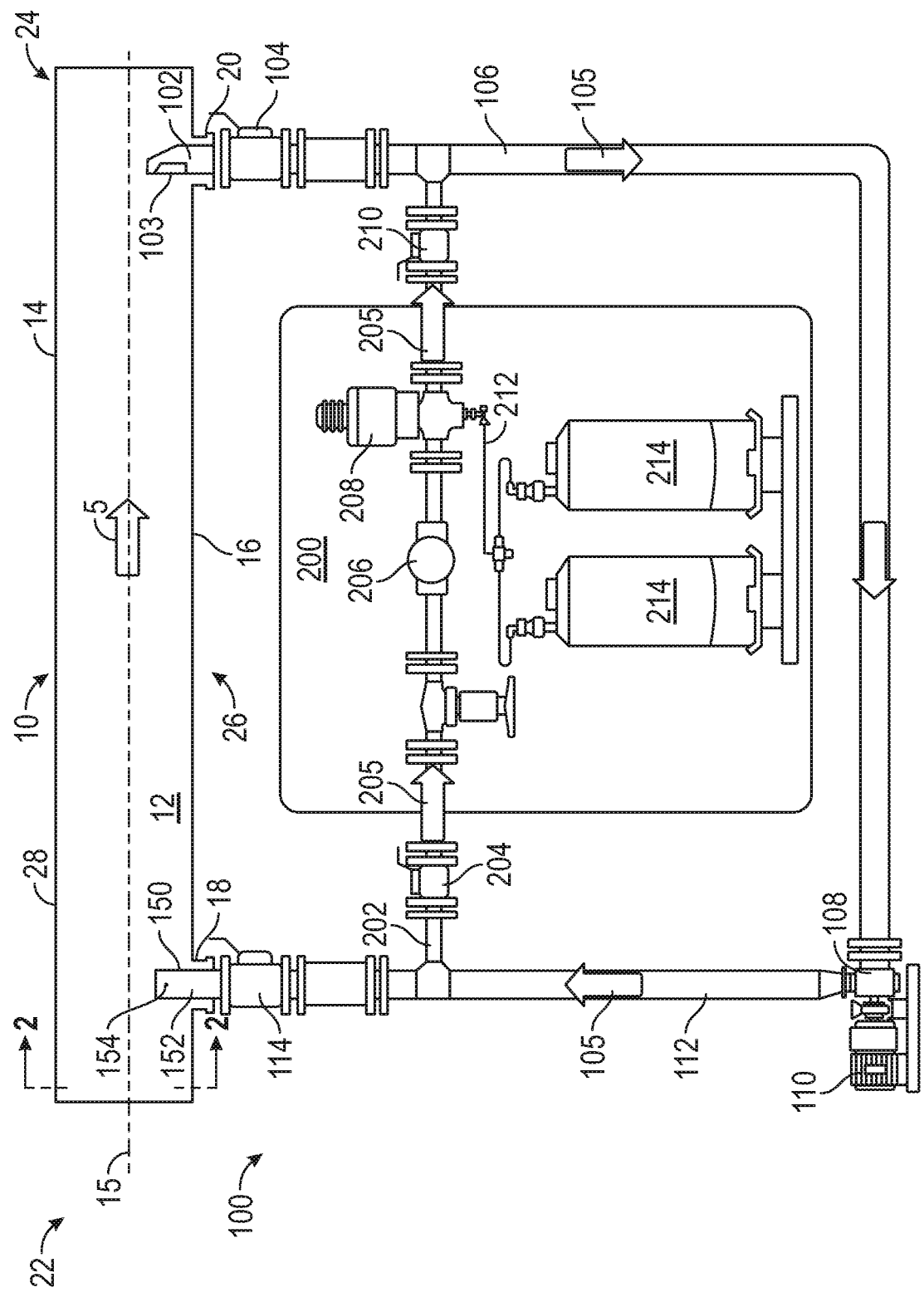
FIG. 1 is a schematic view of embodiments of a fluid mixing system and a fluid sampling system for use with a pipeline in accordance with principles disclosed herein.

In the drawings and description that follow, like parts are typically marked throughout the specification and drawings with the same reference numerals. The drawing figures are not necessarily to scale. Certain features of the disclosed embodiments may be shown exaggerated in scale or in somewhat schematic form and some details of conventional elements may not be shown in the interest of clarity and conciseness. The present disclosure is susceptible to embodiments of different forms. Specific embodiments are described in detail and are shown in the drawings, with the understanding that the present disclosure is to be considered an exemplification of the principles of the disclosure, and is not intended to limit the disclosure to that illustrated and described herein. It is to be fully recognized that the different teachings of the embodiments discussed below may be employed separately or in any suitable combination to produce desired results.

Unless otherwise specified, in the following discussion and in the claims, the terms "including" and "comprising" are used in an open-ended fashion, and thus should be interpreted to mean "including, but not limited to . . . ". Any use of any form of the terms "connect", "engage", "couple", "attach", or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

Referring to FIG. 1, an embodiment of a fluid mixing system 100 for use with a fluid conduit or pipeline 10 is shown. Fluid pipeline 10 is generally configured to facilitate the transport of a fluid flowing (indicated by arrow 5 in FIG. 1) therein. In the embodiment of FIG. 1, fluid mixing system 100 is generally configured to mix the contents of pipeline fluid flow 5 within fluid pipeline 10 to provide a substantially homogenous mixture therein for sampling by a fluid sampling system 200. Thus, in this embodiment, fluid mixing system 100 allows fluid sampling system 200 to capture a representative sample of the fluid comprising pipeline fluid flow 5, where pipeline fluid flow 5 comprises a first fluid and at least one additional or second fluid that has one or more properties (e.g., density, viscosity, etc.) that vary from properties of the first fluid. In the embodiment of FIG. 1, pipeline fluid flow 5 comprises hydrocarbons and water; however, in other embodiments, pipeline fluid flow 5 may comprise varying mixtures of a number of different fluids, including immiscible and/or miscible fluids.

In some embodiments, fluid sampling system 200 of fluid mixing system 100 may be used in custody-transfer, allocation, and quality measurement applications. Thus, in at least some embodiments, the performance of sampling system 200 is dependent upon capturing a substantially homogenous or representative mixture of the different fluids comprising pipeline fluid flow 5, with mixing system 100 serving to increase the homogeneity and representativeness of the fluid sample captured from pipeline fluid flow 5 by sampling system 200. However, although the embodiment of fluid mixing system 100 shown in FIG. 1 includes fluid sampling system 200, in other embodiments, fluid mixing system 100 may not include a sampling system. Moreover, in other embodiments, fluid mixing system 100 may be used in conjunction with fluid systems other than fluid pipelines.

In the embodiment of FIG. 1, fluid pipeline 10 has a central or longitudinal axis 15 and includes a central bore or passage 12, an upper end or top 14, and a lower end or bottom 16. Specifically, the top 14 of pipeline 10 is disposed above bottom 16 relative to the surface of the Earth such that gravity applies a force to the fluid comprising pipeline fluid flow 5 in the direction of bottom 16. In the embodiment of FIG. 1, pipeline 10 includes a first or upstream port 18 and a second or downstream port 20 axially spaced from upstream port 18 and located downstream of port 18 respective the direction of pipeline fluid flow 5. Each port 18, 20, extends radially through a generally cylindrical wall 28 of pipeline 10 that defines central passage 12 to provide fluid communication between ports 18, 20, and passage 12. In this configuration, pipeline 10 includes a first or upstream zone 22 extending upstream from upstream port 18, a second or downstream zone 24 extending downstream from downstream port 20, and a third or mixing zone 26 extending axially between ports 18 and 20.

In the embodiment of FIG. 1, fluid mixing system 100 generally includes a fluid extraction probe 102, a suction valve 104, a fluid first or suction conduit 106, a fluid energizer or pump 108 powered by a power or energy source 110, a fluid second or discharge conduit 112, a discharge valve 114, and a mixing assembly or jet-mixer 150. Probe 102 of mixing system 100 extends through downstream port 20 into central passage 12 of pipeline 10. Probe 102 includes a fluid inlet 103 that receives or captures fluid from pipeline fluid flow 5 for passage into suction conduit 106 as a fluid mixing flow (indicated by arrow 105 in FIG. 1). In the embodiment of FIG. 1, fluid inlet 103 of probe 102 is positioned towards the bottom 16 of pipeline 10 (e.g., between central axis 15 and bottom 16); however, in other embodiments, fluid inlet 103 may be positioned along central axis 15 or towards the top 14 of pipeline 10 (e.g., between central axis 15 and top 14). Additionally, in the embodiment of FIG. 1, probe 102 is disposed orthogonal central axis 15 of pipeline 10 such that a central axis of probe 102 intersects central axis 15; however, in other embodiments, probe 102 may be radially offset from central axis 15 of pipeline 10.

Suction conduit 106 of fluid mixing system 100 directs the mixer fluid flow 105 from the fluid inlet 103 of probe 102 into a suction of pump 108. In this embodiment, suction valve 104 allows for the selective isolation of discharge conduit 106 from the central passage 12 of pipeline 10. Pump 108 is generally configured to energize mixer fluid flow 105 as it enters the suction thereof and discharge an energized mixer fluid flow 105 to the discharge conduit 112. In the embodiment of FIG. 1, pump 108 is configured to increase the fluid pressure of mixer fluid flow 105 prior to being injected into passage 12 of pipeline 10 via jet-mixer 150. Although pump 108 is shown in FIG. 1 as comprising a rotary pump powered by an electric motor 110, in other embodiments, other mechanisms may be used to energize mixer fluid flow 105 prior to injection into passage 12 of pipeline 10. In still other embodiments, fluid mixing system 100 may not include pump 108 or any other externally powered fluid energizer, and instead, may rely on the fluid pressure of pipeline fluid flow 5 for supplying sufficient fluid pressure to jet-mixer 150.

As described above, fluid sampling system 200 is generally configured to capture a representative sample of the fluid comprising pipeline fluid flow 5. In the embodiment of FIG. 1, sampling system 200 generally includes a sampling conduit 202 configured to transport a sampling fluid flow (indicated by arrows 205 in FIG. 1), a first or upstream sampling valve 204, a sampling flow indicator 206, a fluid sampler 208, a second or downstream sampling valve 210, a receiver conduit 212, and a pair of sample receivers or sample storage units 214. Sampling fluid flow 205 flows into sampling conduit 202 from discharge conduit 112 and flows out of sampling conduit 202 into suction conduit 106. In this embodiment, sampling valves 204 and 210 allow for the selective isolation of sampling system 200 from fluid mixing system 100.

Flow indicator 206 indicates the flow rate of sampling fluid flow 205 while fluid sampler 208 is configured to capture a fluid sample from sampling fluid flow 205 via storage units 214. In the embodiment of FIG. 1, fluid sampler 208 comprises a flow-through cell sampler configured to discharge a predetermined volume of sampled fluid from sampling fluid flow 205 to receiver conduit 212 and storage units 214. As discussed above, fluid sampling system 200 may be used in custody-transfer, allocation, and quality measurement applications. In at least some applications, the performance of fluid sampling system 200 is dependent upon the fluid composition of sampling fluid flow 205 comprising a representative sample of the fluid composition of pipeline fluid flow 5. However, in some applications, pipeline fluid flow 5 may comprise a plurality of fluids that may not provide a representative sample for fluid sampler 208 if not mixed by fluid mixing system 100. Additionally, in some applications, the flow rate of pipeline fluid flow 5 may vary over time, and thus, may comprise a relatively flow rate not conducive for natural mixing of the fluid elements of pipeline fluid flow 5. Thus, fluid mixing system 100 is configured to energize pipeline fluid flow 5 to provide a relatively homogenous mixture of the fluid elements of pipeline fluid flow 5 to probe 102, where the fluid received by probe 102 is subsequently provided to fluid sampler 208 via fluid sampling flow 205. Additionally, in some embodiments, fluid mixing system 100 is configured to adapt to changing conditions of pipeline fluid flow 5, such as changes in fluid composition, flow rate, turbulence, etc., to ensure a relatively homogenous mixture generally representative of the fluid composition of pipeline fluid flow 5 is provided to fluid sampler 208 of sampling system 200.

Referring to FIGS. 1-6, jet-mixer 150 of mixing assembly 100 is generally configured to inject mixer fluid flow 105 into the central passage 12 of pipeline 10 to thereby break-up large globules of a second fluid dispersed in a first fluid of pipeline fluid flow 5 into smaller droplets and/or distribute the droplets of the second fluid more evenly across the cross-section of passage 12. In the embodiment of FIGS. 1-6, the second fluid of pipeline fluid flow 5 comprises water while the first fluid comprises hydrocarbons. Particularly, jet-mixer 150 is configured to inject mixer fluid flow 105 into central passage 12 of pipeline 10 as one or more jets of fluid, where jet-mixer 150 is further configured in this embodiment to control or adjust the velocity of the jets of mixer fluid flow 105 injected into passage 12. In the embodiment of FIGS. 1-6, jet-mixer 150 extends into passage 12 via upstream port 18, and thus, is positioned in passage 12 upstream from probe 102. Additionally, in the embodiment of FIGS. 1-6, discharge valve 114 is positioned between a terminal end of discharge conduit 112 and jet-mixer 150 to allow for the selective isolation of passage 12 of pipeline 10 from discharge conduit 112.

Figure 2:
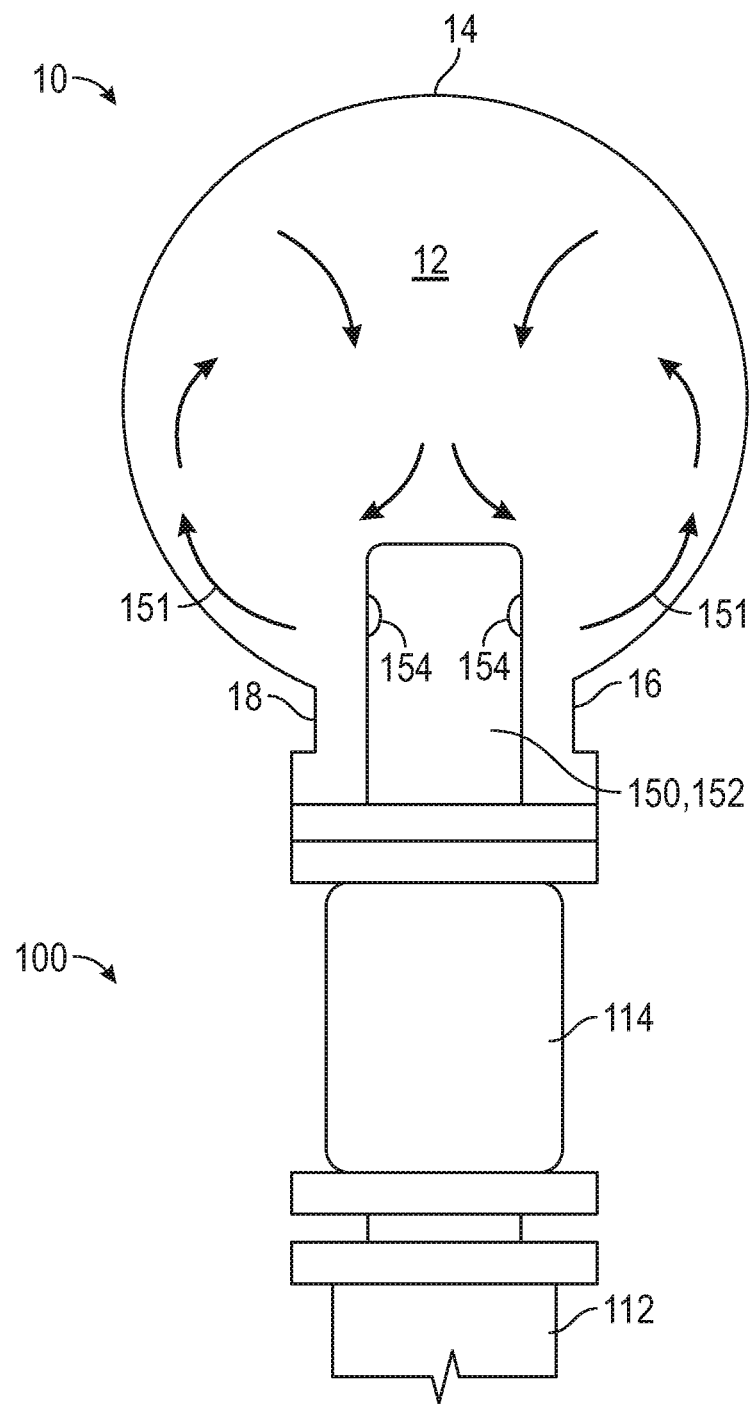
FIG. 2 is a cross-sectional view along line 2-2 of FIG. 1 of the pipeline of FIG. 1.
Figure 3:
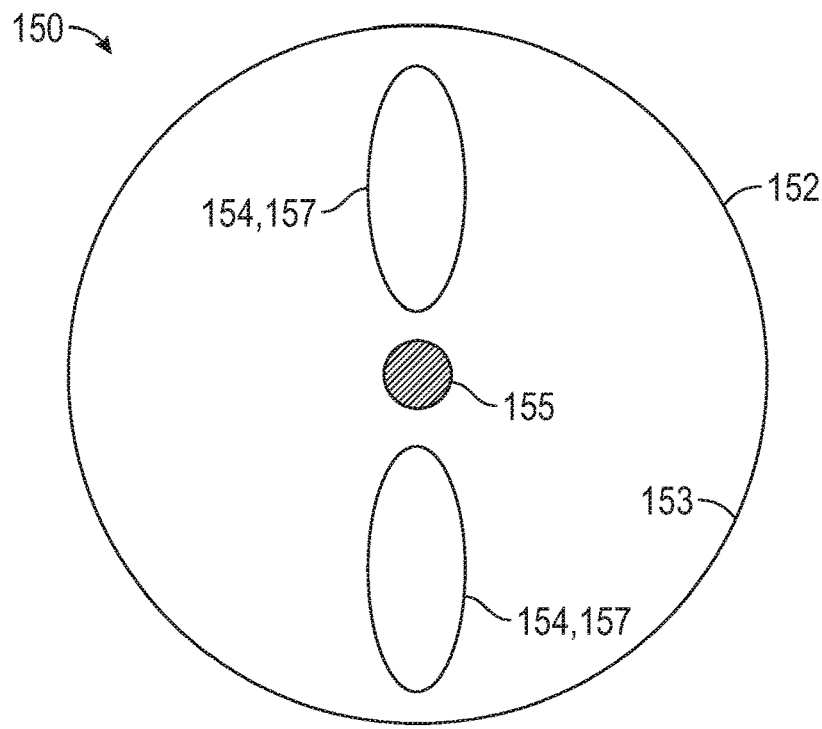
FIG. 3 is a first cross-sectional view of an embodiment of a jet-mixer of the fluid mixing system of FIG. 1 in accordance with principles disclosed herein.

As shown particularly in FIG. 2, in the embodiment of FIGS. 1-6, jet-mixer 150 includes an outer housing 152 and a plurality of circumferentially spaced mixer ports or jets 154, with jets 154 being disposed within central passage 12 of pipeline 10. In this embodiment, jets 154 are positioned proximal the bottom 16 of pipeline 10 and tangential to pipeline fluid flow 5 (directed into the page in FIG. 2). In this configuration, jet-mixer 150 is configured to translate mixer fluid flow 105 into a pair of mixing helical fluid flows or fluid jets 151 that flow tangential to the direction of pipeline fluid flow 151, where each helical fluid flow 151 is emitted from a corresponding jet 154 of jet-mixer 150. In this manner, helical fluid flows 151 break-up large water droplets of pipeline fluid flow 5 into smaller droplets and assist in rotating the fluid contents comprising pipeline fluid flow 5. Although in the embodiment of FIGS. 1-6 jet-mixer 150 is shown as comprising a pair of jets 154 circumferentially spaced approximately 180° apart; in other embodiments, jets 154 may be spaced at varying angles (e.g., spaced 120° apart, etc.). Additionally, in other embodiments, the housing 152 of jet-mixer 150 may comprise a varying number of jets, including axially spaced jets.

Figure 4:
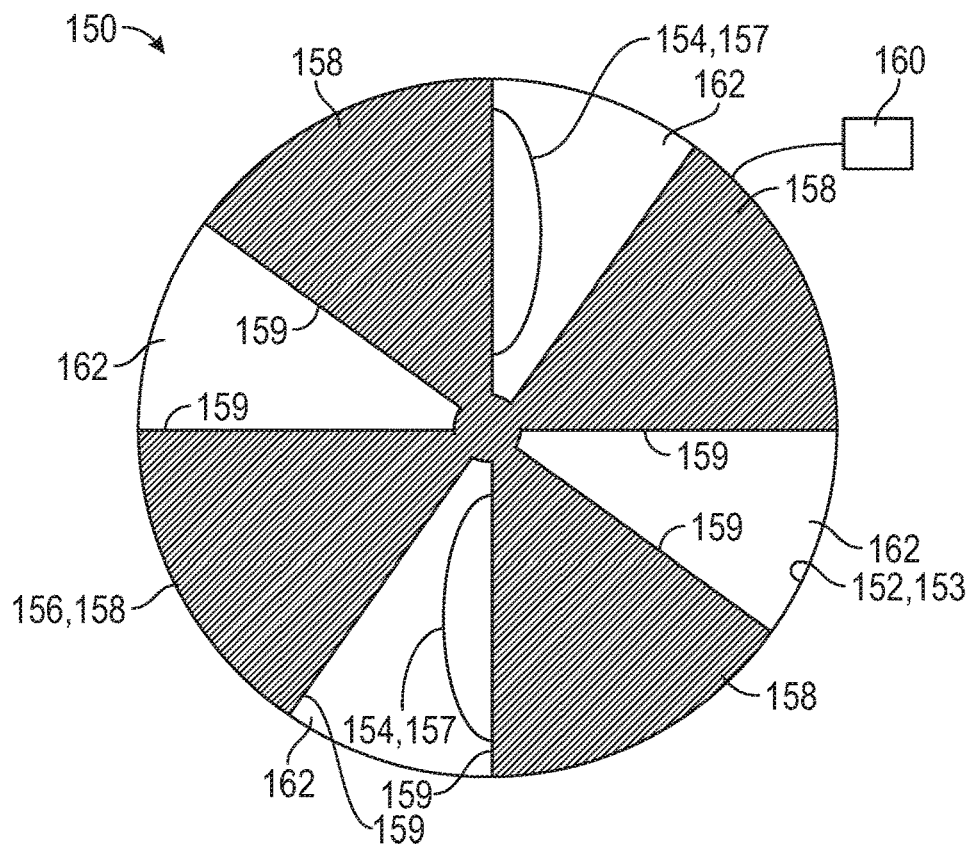
FIG. 4 is a second cross-sectional view of the jet-mixer of FIG. 3.

As mentioned above, jet-mixer 150 is configured to control or adjust the velocity of helical fluid flows 151. As shown particularly in FIGS. 3 and 4, in the embodiment of FIGS. 1-6, jet-mixer 150 additionally includes a rotor 156 (shown in FIG. 4) rotatably disposed in housing 152. Particularly, jet-mixer 150 has a central or longitudinal axis 155 (shown in FIGS. 3 and 4) extending through housing 152 and rotor 156, where rotor 156 is configured to rotate bout central axis 155. In the embodiment of FIG. 4, rotor 156 comprises four circumferentially spaced blades 158 each extending radially between central axis 155 and a generally cylindrical inner surface 153 of housing 152. In this arrangement, housing 152 comprises a stator 152 with rotor 156 rotatably disposed therein.

In the embodiment of FIG. 4, rotor 156 is driven in rotation within housing 152 by a motor 160 (shown schematically in FIG. 4); however, in other embodiments, the rotation of rotor 156 within housing 152 may be driven by the fluid pressure of mixer fluid flow 105. As rotor 156 rotates within housing 152 via motor 160, blades 158 of rotor 156 cyclically block or restrict mixer fluid flow 105 from entering jets 154. For instance, an arcuate gap 162 formed in rotor 156 extends circumferentially between radially extending edges 159 of each adjacently positioned blade 158 of rotor 156. When jets 154 are in an unblocked position disposed entirely within gaps 162, mixer fluid flow 105 is unrestricted from entering jets 154 of jet-mixer 150 and central passage 12 of pipeline 10. The unblocked position of jets 154 corresponds with a first angular position of rotor 156 in housing 152 of jet-mixer 150. However, when jets 154 are in a blocked position disposed entirely between radial edges 159 of blades 158, fluid communication is prevented between mixer fluid flow 105 and central passage 12 of pipeline 10, or in other words, blades 158 prevent or restrict mixer fluid flow 105 from entering jets 154. The blocked position of jets 154 corresponds with a second angular position of rotor 156 in housing 152 that is angularly spaced from the first angular position. Additionally, in the embodiment of FIGS. 3 and 4, blades 158 of rotor 156 may partially overlap jets 154 (shown in FIG. 4) in a partially blocked position to thereby partially restrict or occlude mixer fluid flow 105 from entering jets 105, and in-turn, passage 12 of pipeline 10. The partially blocked position of jets 154 corresponds with a third angular position of rotor 156 in housing 152 that is disposed angularly between the first and second angular positions of rotor 156.

Figure 5:
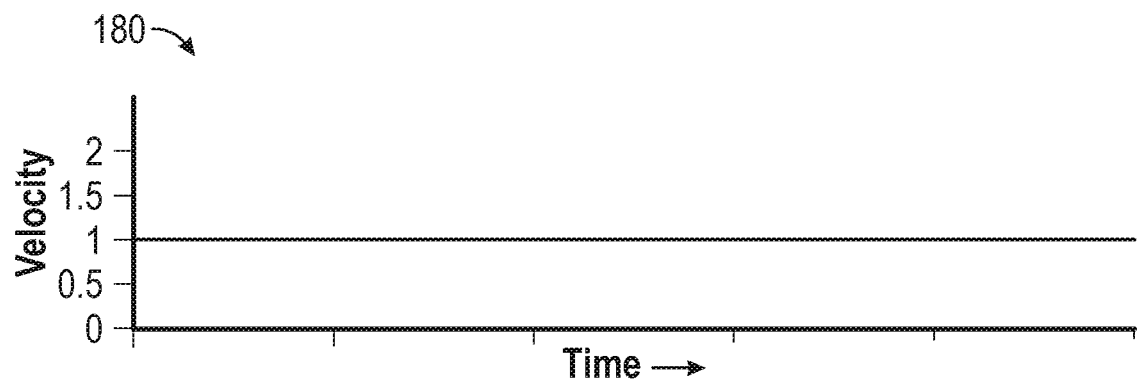
FIG. 5 is a graph depicting an embodiment of a first velocity profile of the jet-mixer of FIG. 3 in accordance with principles disclosed herein.
Figure 6:
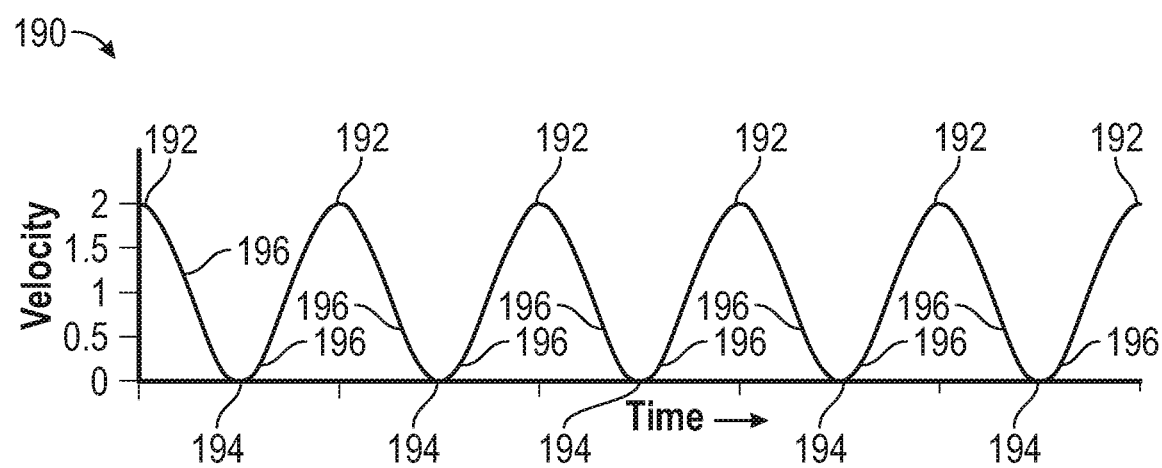
FIG. 6 is a graph depicting an embodiment of a second velocity profile of the jet-mixer of FIG. 3 in accordance with principles disclosed herein.

FIG. 5 illustrates a first or constant velocity profile 180 (velocity amplitude indicated on the Y-axis and time indicated on the X-axis) of helical fluid flows 151 emitted from jets 154 with rotor 156 of jet-mixer 150 stationary (not rotating about central axis 155) and jets 154 in the unblocked position. In this arrangement, helical fluid flows 151 are emitted from jets 154 at a constant velocity, and thus, imparts a constant amount of energy to the fluid comprising pipeline fluid flow 5 assuming a constant flow rate of pipeline fluid flow 5. FIG. 6 illustrates a second or sinusoidal velocity profile 190 of helical fluid flows 151 of the jet-mixer 150 while rotor 156 rotates within housing 152 about central axis 155 at a fixed or constant rotational speed. In the embodiment of FIG. 6, velocity profile 190 comprises a plurality of cyclically-repeating velocity peaks 192 corresponding to an unblocked position of jets 154, a plurality of cyclically-repeating velocity valleys or stoppages 194 corresponding to the blocked position of jets 154, and a plurality of cyclically-repeating velocity ramps or transitions 196 corresponding to the partially blocked position of jets 154, where velocity transitions 196 extend temporally between each adjacent velocity peak 192 and stoppage 194.

In the embodiment of FIG. 6, sinusoidal velocity profile 190 comprises a sin wave with velocity peaks 192 that have twice the amplitude of the constant velocity amplitude provided by constant velocity profile 180 of FIG. 5, and stoppages 194 having a velocity at or near zero. In other embodiments, stoppages 194 of sinusoidal velocity profile 190 may comprise a minimal but non-zero fluid velocity such that the sinusoidal velocity profile 190 always provides a fluid velocity greater than zero (e.g., sinusoidal velocity profile 190 may be shifted upwards such that stoppages 194 are above zero). Not intending to be bound by any theory, the increased amplitude of the velocity peaks 192 of sinusoidal velocity profile 190 relative to the velocity provided by constant velocity profile 180 results from increased fluid pressure within housing 152 of jet-mixer 150 when jets 154 are blocked by the blades 158 of rotor 156. Thus, in the blocked position, pump 108 of mixing system 100 acts to increase the pressure of mixer fluid flow 105 discharged therefrom as helical fluid flows 151 when jets 154 are in the blocked position, thereby increasing the velocity of helical fluid flows 151 when jets 154 become unblocked.

As shown in FIGS. 5 and 6, although the sinusoidal velocity profile 190 varies in velocity overtime, it comprises the same average velocity as constant velocity profile 180 (a velocity amplitude of 1.0 in the embodiment of FIGS. 5 and 6). However, while not intending to be bound by any theory, the amount of energy provided to pipeline fluid flow 5 from the helical fluid flows 151 exiting jets 154 of jet-mixer 150 varies with the cube of the velocity of helical fluid flows 151. Thus, velocity peaks 192 of sinusoidal velocity profile 190, having twice the velocity amplitude as the constant amplitude of constant velocity profile 180, provide eight times the energy to pipeline fluid flow 5. In-turn, although sinusoidal velocity profile 190 has the same average velocity amplitude over time as constant velocity profile 180, provides a greater average amount of energy over time (2.5 times more energy in this embodiment) to the fluid of pipeline fluid flow 5 from helical fluid flows 151. The increased average energy inputted to pipeline fluid flow 5 via sinusoidal velocity profile 190 thereby increases the degree of mixing of the contents of fluid flow 5 (water and hydrocarbons in the embodiment of FIGS. 1-6) to provide a relatively more homogenous mixture of the fluid components comprising pipeline fluid flow 5 (e.g., water and hydrocarbons) than the mixture provided by constant velocity profile 180. Moreover, sinusoidal velocity profile 190 provides enhancing mixing of pipeline fluid flow 5 without requiring additional external power to be supplied to pump 108 from electric motor 110.

In the embodiment of FIGS. 1-6, sinusoidal velocity profile 190 of FIG. 6 is at least partially formed or defined by the shape of blades 158 of rotor 156, the shape of jets 154 of housing 152, and the rotational speed of rotor 156. For instance, the frequency of sinusoidal velocity profile 190 (e.g., the number of velocity peaks 192 provided in a fixed period of time) may be increased by increasing the rotational speed of rotor 156 and decreased by decreasing the rotational speed of rotor 156. In some embodiments, the rotational speed of rotor 156 may be adjusted via motor 160 to account for changes in pipeline fluid flow 5. For instance, a reduction in the flow rate of pipeline fluid flow 5 may require additional energy to be inputted to fluid flow 5 from helical fluid flows 151 of mixing system 100 to achieve satisfactory mixing of the components of pipeline fluid flow 5. Thus, in response to a decrease in the flow rate of pipeline fluid flow 5, motor 160 may be configured (via, e.g., a flow sensor and accompanying controller, etc.) to increase the rotational speed of rotor 156 of jet-mixer 150 to ensure adequate mixing of the contents of pipeline fluid flow 5. Conversely, motor 160 may be configured to reduce the rotational speed of rotor 156 in response to an increase in the flow rate of pipeline fluid flow 5 to conserve power or energy consumed by fluid mixing system 100.

Additionally, the velocity profile of helical fluid flows 151 is at least partially formed or defined by the shape of blades 158 of rotor 156, and the shape of jets 154 of housing 152. For instance, in the embodiment of FIGS. 1-6, each jet 154 of the housing 152 are defined by a curved or oval shaped inner surface 157 while the radial edges 159 of blades 158 are linear or rectilinear in shape. In this arrangement, with rotor 156 rotating within housing 152, the surface area of jets 154 is gradually reduced as radial edges 159 of rotor blades 158 gradually sweep over and block or obstruct jets 154 (shown in FIG. 4). The gradual reduction in unblocked or unobstructed surface area of jets 154 accounts for the gradual reduction in velocity amplitude of velocity transitions 196 shown in FIG. 6. Similarly, as rotor blades 158 rotate about central axis 155 in housing 152, the surface area of jets 154 are gradually uncovered or unblocked by blades 158, producing the gradual or curved increase in velocity amplitude of velocity transitions 196. Thus, by altering either the shape of jets 154 and/or edges 159 of blades 158, the shape of the velocity profile of helical fluid flows 151 may be altered.

Figure 7:
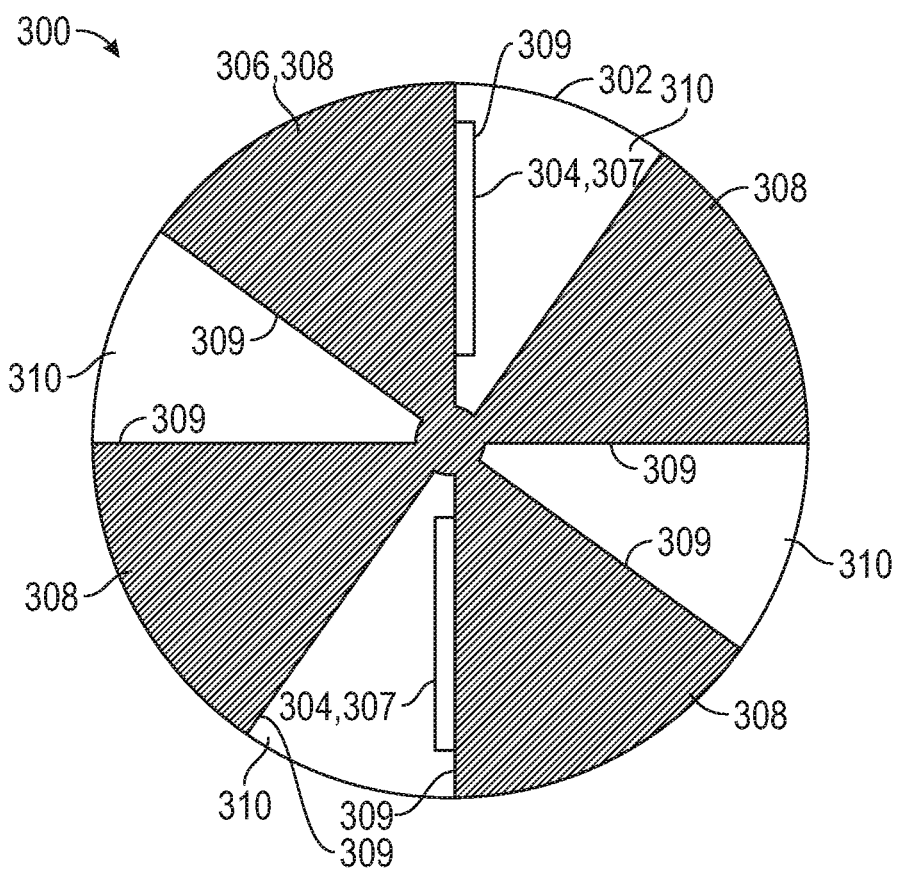
FIG. 7 is a cross-sectional view of another embodiment of a jet-mixer of the fluid mixing system of FIG. 1 in accordance with principles disclosed herein.
Figure 8:
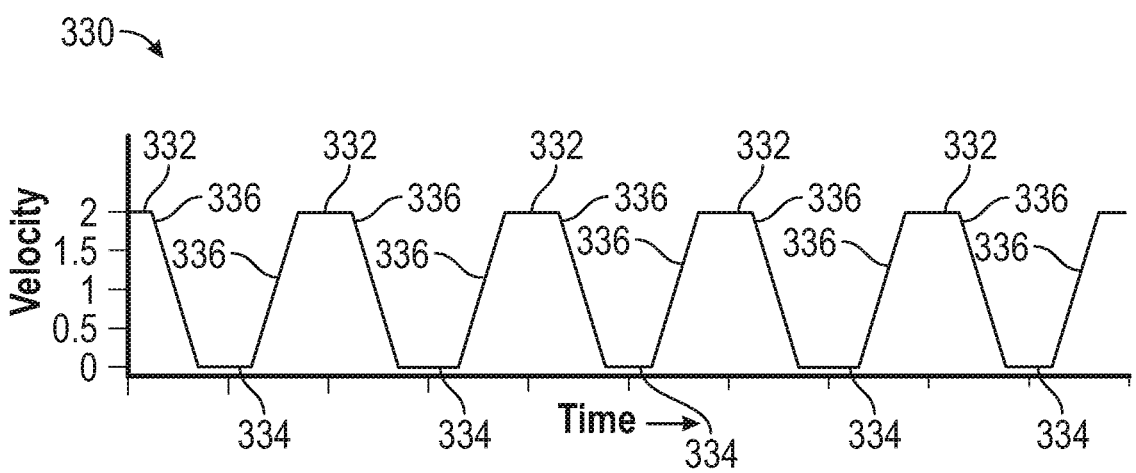
FIG. 8 is a graph depicting an embodiment of a velocity profile of the jet-mixer of FIG. 7 in accordance with principles disclosed herein.

For instance, referring to FIGS. 7 and 8, another embodiment of a jet-mixer 300 configured to provide helical fluid flows having a third or clipped sin wave velocity profile 330 is shown. Similar to jet-mixer 150 shown in FIGS. 3 and 4, jet-mixer 300 comprises an outer housing or stator 302, a plurality of ports or jets 304 formed in housing 302, and a rotor 306 rotatably disposed in housing 302 and comprising a plurality of circumferentially spaced rotor blades 308. However, unlike the curved inner surface 157 of the jets 154 of jet-mixer 150 shown in FIGS. 3 and 4, jets 304 of jet-mixer 300 are each defined by a generally rectangular inner surface 307 that corresponds with or matches the linear or rectilinear radial edges 309 of rotor blades 308. Similar to jet-mixer 150, arcuate gaps 310 extend circumferentially between each adjacently disposed pair of radial edges 309 of the rotor blades 308 of jet-mixer 300. As shown particularly in FIG. 8, clipped velocity profile 330 comprises a plurality of cyclically-repeating velocity peaks 332 corresponding to an unblocked position of jets 304, a plurality of cyclically-repeating velocity valleys or stoppages 334 corresponding to the blocked position of jets 304, and a plurality of cyclically-repeating velocity ramps or transitions 336 corresponding to the partially blocked position of jets 304, where velocity transitions 336 extend temporally between each adjacent velocity peak 332 and stoppage 334. In some embodiments, stoppages 334 of clipped velocity profile 330 may comprise a minimal but non-zero fluid velocity such that the clipped velocity profile 330 always provides a fluid velocity greater than zero (e.g., clipped velocity profile 330 may be shifted upwards such that stoppages 334 are above zero). In such an embodiment, rotor blades 308 and jets 304 may be configured such that at least one jet 304 is always at least partially unblocked.

Figure 9:
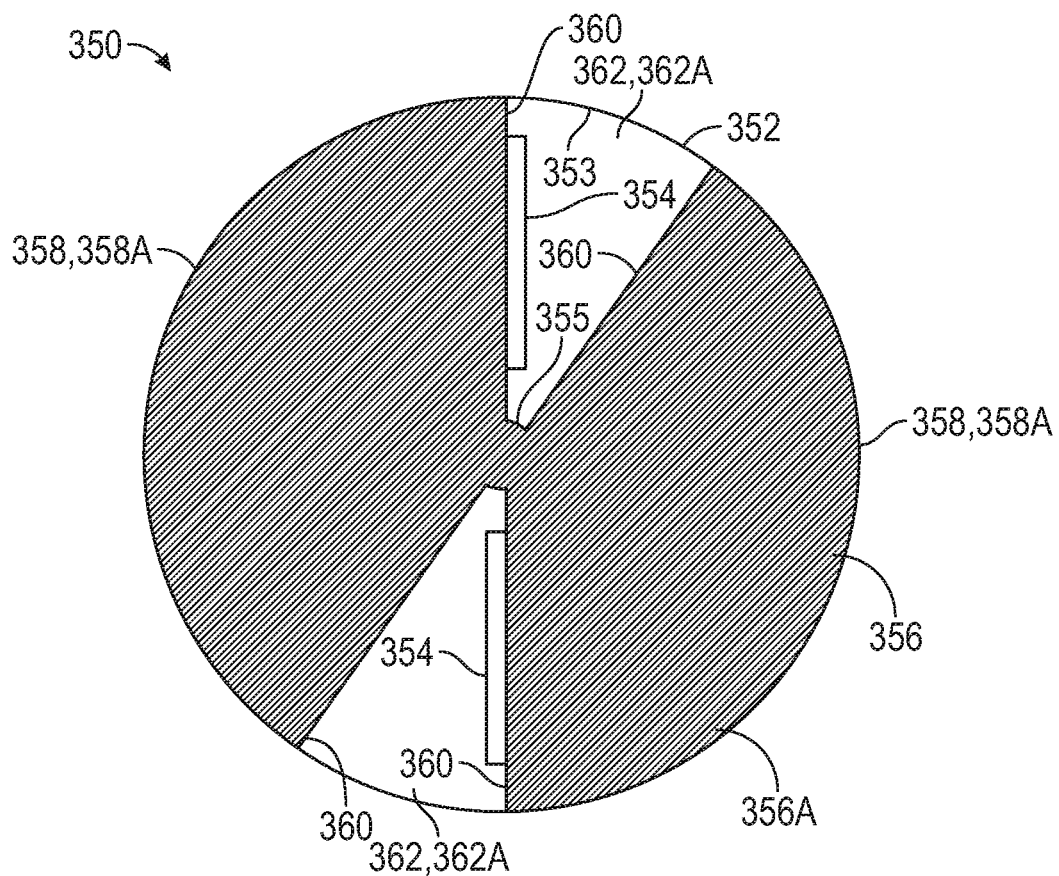
FIG. 9 is a cross-sectional view of another embodiment of a jet-mixer of the fluid mixing system of FIG. 1 in accordance with principles disclosed herein.

In the embodiment of FIGS. 8 and 9, velocity transitions 336 of clipped velocity profile 330 are more linear or square and less curved or sinusoidal than the velocity transitions 196 of sinusoidal velocity profile 190 shown in FIG. 6. Thus, for a given cycle (e.g., the time period between the midpoint of adjacent velocity peaks 332) of clipped velocity profile 330, a greater portion of the time duration of the cycle of profile 330 comprises velocity peak 332 and stoppage 334 relative to each cycle of sinusoidal velocity profile 190. In other words, velocity transitions 336 of clipped velocity profile 330 are more rapid or abrupt at a given rotational speed of rotor 306 relative to sinusoidal velocity profile 190. In this manner, the variance in velocity amplitude over time of clipped velocity profile 330 is greater than the variance in velocity amplitude in either sinusoidal velocity profile 190 of FIG. 6 or constant velocity profile 180 of FIG. 5.

Given that clipped velocity profile 330 has a greater variance in velocity amplitude and spends a greater portion of time per cycle at velocity peak 332, clipped velocity profile 330 provides or injects a relatively greater amount of energy over time (at a given rotational speed of the rotor of the jet-mixer, and at a given flow rate of pipeline fluid flow 5) into pipeline fluid flow 5 (via helical fluid flows extending from jets 304 of jet-mixer 300) than sinusoidal velocity profile 190. Thus, in some applications, such as low-flow applications or applications requiring a greater degree of mixing or agitation to achieve a relatively homogenous mixture of the contents of pipeline fluid flow 5, the clipped velocity profile 330 of jet-mixer 300 may be used to provide a relatively greater degree of mixing of the contents of pipeline fluid flow 5.

Beyond varying the rotational speed of the rotor (e.g., rotors 156, 304) of the jet-mixer (e.g., jet-mixers 150, 300) and varying the geometry of either the jets (e.g., jets 154, 304) and/or radial edges (e.g., radial edges 159, 309) of the rotor blades (e.g., rotor blades 158, 308) of the jet-mixer, variations in the velocity profile provided by the jet-mixer may also be achieved by varying the ratio in surface area between the rotor blades and the arcuate gaps (e.g., arcuate gaps 162, 310) extending between each adjacently disposed pair of rotor blades. For instance, referring to FIGS. 9 and 10, another embodiment of a jet-mixer 350 configured to provide helical fluid flows having a fourth or high-amplitude velocity profile 380 is shown. Similar to jet-mixer 300 shown in FIG. 7, jet-mixer 350 comprises an outer housing or stator 352, a plurality of ports or jets 354 formed in housing 352, and a rotor 356 rotatably disposed in housing 352 and comprising a plurality of circumferentially spaced rotor blades 358. However, unlike rotor 306 of jet-mixer 300 which includes four rotor blades 308, rotor 356 includes a pair of rotor blades 358. Each rotor blade 358 includes a pair of radially extending edges 360, with a pair of circumferentially spaced, arcuate gaps 362 extending between the pair of rotor blades 358.

Figure 10:
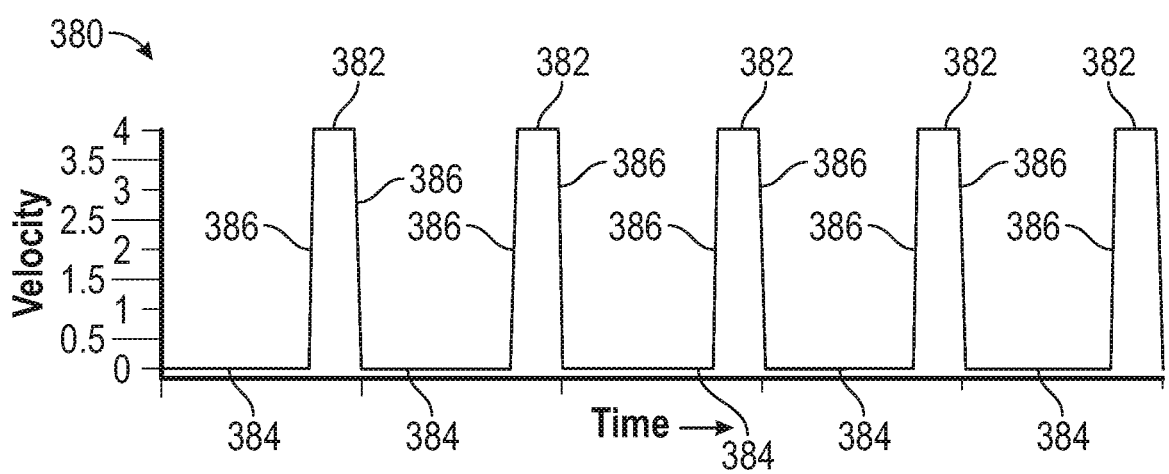
FIG. 10 is a graph depicting an embodiment of a velocity profile of the jet-mixer of FIG. 9 in accordance with principles disclosed herein.

In the embodiment of FIGS. 9 and 10, each rotor blade 358 has a surface area 358A generally defined by a radial length or distance between a radial inner end of blade 358 located proximal a central or longitudinal axis 355 of jet-mixer 350 and a radial outer end of blade 358 located proximal an inner cylindrical surface 353 of housing 352, and an arcuate length or distance between the pair of radial edges 360. Similarly, each arcuate gap 362 formed between rotor blades 358 has a surface area 362A generally defined a radial length or distance between a radial inner end of gap 362 located proximal central axis 355 and a radial outer end of gap 362 defined by inner surface 353, and an arcuate length or distance between the pair of radial edges 360 defining gap 362. Additionally, rotor 356 has a surface area 356A that generally corresponds to the sum of the surface area 358A of each rotor blade 358. In the embodiment of FIGS. 9 and 10, the surface area 356A is greater than the combined surface areas 362A of arcuate gaps 362. In other words, with each rotation of rotor 356 in housing 352, jets 354 of jet-mixer are disposed in the blocked position for a greater amount of time than the unblocked position.

As shown particularly in FIG. 10, high-amplitude velocity profile 380 comprises a plurality of cyclically-repeating velocity peaks 382 corresponding to an unblocked position of jets 354, a plurality of cyclically-repeating velocity valleys or stoppages 384 corresponding to the blocked position of jets 354, and a plurality of cyclically-repeating velocity ramps or transitions 386 corresponding to the partially blocked position of jets 354, where velocity transitions 386 extend temporally between each adjacent velocity peak 382 and stoppage 384. Unlike the clipped velocity profile 330 shown in FIG. 8, velocity peaks 382 extend for a relatively shorter duration than stoppages 384 per cycle (e.g., the time period between the midpoint of adjacent velocity peaks 382). For instance, in an embodiment where each cycle of velocity profile comprises 1.0 second, each stoppage 384 may continue for 0.6 while each corresponding velocity peak 382 may extend for 0.3 seconds. The increased temporal duration of each stoppage 384 relative each velocity peak 382 results from the relatively greater surface area 356A of rotor 356 than the combined surface areas 362A of arcuate gaps 362.

Further, due to the temporal imbalance described above with respect to stoppages 384 and velocity peaks 382 of high-amplitude velocity profile 380, the velocity amplitude is increased (shown as 4.0 in the embodiment of FIG. 10 relative to the 1.0 amplitude of constant velocity profile 180 of FIG. 5) relative to the velocity amplitude of the velocity peaks 332 (shown as 2.0 in the embodiment of FIG. 10 relative to the 1.0 amplitude of constant velocity profile 180 of FIG. 5) of clipped velocity profile 330. The relative increase in velocity amplitude of velocity peaks 382 results from increased fluid pressure buildup within housing 352 from mixer fluid flow 105 that occurs during stoppages 384. Particularly, during each stoppage 384 of high-amplitude velocity profile 380, pump 380 continues to energize or pressurize the fluid of mixer fluid flow 105 disposed in discharge conduit 106 and housing 352 of jet-mixer 350. Given that each stoppage 384 continues for a relatively greater amount of time per cycle of high-amplitude velocity profile 380 relative to each stoppage 334 of clipped velocity profile 330, pump 108 pressurizes the fluid of mixer fluid flow 105 to a relatively greater degree, resulting in the relatively increased velocity amplitude of each velocity peak 382. An output pressure or pump rate of pump 108 may be controlled or modulated to control the amount of energy imparted to the pipeline fluid flow 5 from jets 354. Moreover, due to the increase in velocity amplitude of velocity peaks 382, high-amplitude velocity profile 380 provides relatively more energy to pipeline fluid flow 105 (via helical fluid flows from jets 354) per cycle than clipped velocity profile 330.

Referring generally to FIGS. 1-10, FIGS. 6, 8, and 10 illustrate velocity profiles (e.g., velocity profiles 180, 190, 330, and 380) for various embodiments of jet-mixers (e.g., jet-mixers 150, 300, and 350). Particularly, velocity profiles 190, 330, and 380 described above comprise cyclical or pulsed velocity profiles 190, 330, and 380 and jet-mixers 150, 300, and 350 comprise pulsed jet-mixers 150, 300, and 350. Not intending to be bound by any theory, the pulsed velocity profiles 190, 330, and 380 provided by jet-mixers 150, 300, and 350, respectively, are configured to more quickly dissipate energy (e.g., from helical fluid flows 151, etc.) into pipeline fluid flow 5 relative to the constant velocity profile 180. Not intending to be bound by any theory, the rapid dissipation of energy provided by pulsed velocity profiles 190, 330, and 380 efficiently breakup larger droplets of a first fluid (e.g., water) within a second fluid (e.g., crude oil or other hydrocarbons) of pipeline fluid flow 5. However, in some applications, a greater degree of pulse or variance in the velocity profile of a pulsed jet-mixer may entail a reduced degree of circulation of the helical fluid flows ejected therefrom. Thus, pulsed jet-mixers 150, 300, and 350 described herein provide a range of variance in velocity amplitude in the helical fluid flows ejected therefrom (e.g., helical fluid flows 151), including zero for the constant velocity profile 180 of FIG. 5 and 4.0 for high-amplitude velocity profile 380 of FIG. 10. In this manner, the variance in velocity amplitude may be tailored as described above (e.g., varying rotor speed, jet and rotor blade geometry, rotor surface area, jet surface area, etc.) to provide a velocity profile that most effectively and efficiently mixes the contents of pipeline fluid flow 5 over a range of fluid content and flow conditions.

Figure 11:
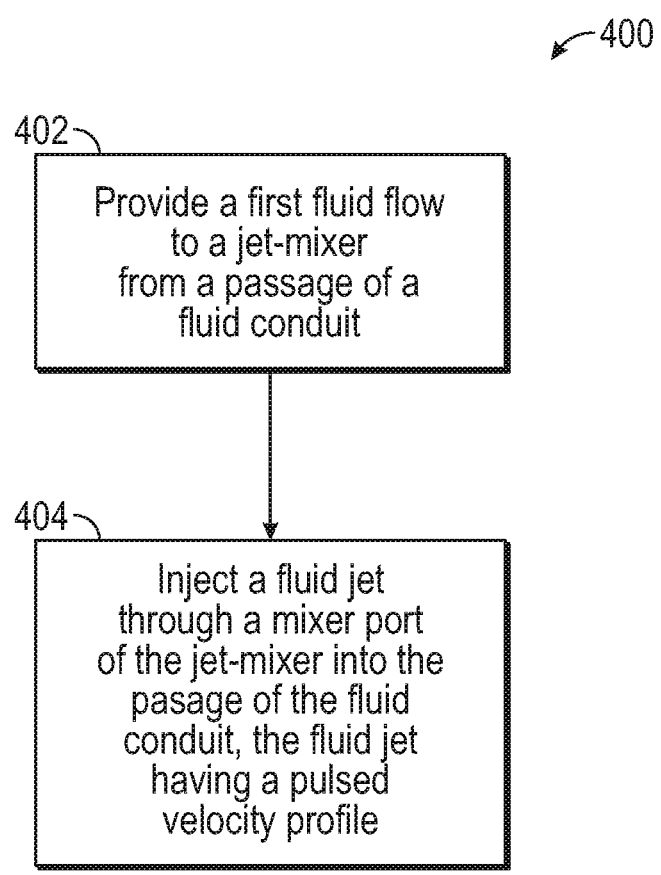
FIG. 11 is a flowchart depicting an embodiment of a method for mixing a fluid flow in a fluid conduit in accordance with principles disclosed herein.

Referring to FIG. 11, an embodiment of a method 400 for mixing a fluid flow in a fluid conduit is shown. Starting at block 402 of method 400, a first fluid flow is provided to a jet-mixer from a passage of the fluid conduit. In some embodiments, block 402 comprises providing mixer fluid flow 105 of FIG. 1 to either jet-mixer 150 of FIGS. 1-6, jet-mixer 300 of FIGS. 7 and 8, and/or jet-mixer 350 of FIGS. 9 and 10. In some embodiments, block 402 comprises capturing fluid from pipeline fluid flow 5 of fluid pipeline 10 of FIG. 1 via the fluid inlet 103 of probe 102. At block 404 of method 400, a fluid jet is injected through a mixer port of the jet-mixer into the passage of the fluid conduit, the fluid jet having a pulsed velocity profile. In some embodiments, block 404 comprises injecting helical fluid flows 151 of FIG. 2 through jets 154 of jet-mixer 150 into the passage 12 of fluid pipeline 10, helical fluid flows 151 having the sinusoidal velocity profile 190 of FIG. 6. In certain embodiments, block 404 comprises injecting helical fluid flows through jets 304 of the jet-mixer 300 of FIGS. 7 and 8 into the passage 12 of fluid pipeline 10, the helical fluid flows having the clipped velocity profile 330 of FIG. 8. In some embodiments, block 404 comprises injecting helical fluid flows through jets 354 of the jet-mixer 350 of FIGS. 9 and 10 into the passage 12 of fluid pipeline 10, the helical fluid flows having the high-amplitude velocity profile 380 of FIG. 10.

The above discussion is meant to be illustrative of the principles and various embodiments of the present disclosure. While certain embodiments have been shown and described, modifications thereof can be made by one skilled in the art without departing from the spirit and teachings of the disclosure. The embodiments described herein are exemplary only, and are not limiting. Accordingly, the scope of protection is not limited by the description set out above, but is only limited by the claims which follow, that scope including all equivalents of the subject matter of the claims.

What is claimed is:

1. A jet-mixer for a fluid mixing system, comprising:
   a housing comprising a mixer port formed in an inner surface of the housing; and a rotor rotatably disposed in the housing, the rotor comprising a rotor blade;
   wherein the rotor comprises a first angular position in the housing restricting fluid flow through the mixer port, and a second angular position allowing fluid flow through the mixer port;
   wherein, in response to rotation of the rotor in the housing, the jet-mixer is configured to inject a first fluid jet through the mixer port into a passage of a fluid conduit that has a pulsed velocity profile.

2. The jet-mixer of claim 1, wherein the pulsed velocity profile comprises a plurality of velocity cycles, each velocity cycle of the velocity cycles, comprising a maximum velocity, a minimum velocity, and a velocity transition extending between the maximum and minimum velocities, wherein the maximum velocity is greater than the minimum velocity.

3. The jet-mixer of claim 2, wherein:
the rotor comprises a first surface area that is greater than a second surface area comprising an arcuate gap formed in the rotor; and
the minimum velocity for each velocity cycle of the pulsed velocity profile obtains for a greater period of time than the maximum velocity for each velocity cycle.

4. The jet-mixer of claim 1, further comprising a motor coupled to the rotor, the motor configured to control a rotational speed of the rotor in the housing and thereby control a frequency of the velocity cycle of the pulsed velocity profile.

5. The jet-mixer of claim 1, wherein the pulsed velocity profile comprises a sinusoidal velocity profile.

6. The jet-mixer of claim 1, wherein the mixer port is defined by a curved inner surface.

7. The jet-mixer of claim 1, wherein the mixer port is defined by a linear inner surface.

8. The jet-mixer of claim 1, wherein the jet-mixer is configured to inject a second fluid jet through the mixer port into the passage of the fluid conduit that has a constant velocity profile when the rotor is held in the second angular position.

9. A fluid system for use with a fluid conduit, comprising:
a probe that extends into a central passage of the fluid conduit through a first port of the fluid conduit; and
a first conduit coupled between the probe and a jet-mixer and configured to direct a first fluid flow to the jet-mixer, wherein the first fluid flow is captured from the passage of the fluid conduit by the probe;
wherein the jet-mixer is configured to receive the first fluid flow from the first conduit and inject a first fluid jet into the passage of the fluid conduit that has a pulsed velocity profile, the first fluid jet configured to mix a conduit fluid flow disposed in the passage of the fluid conduit.

10. The fluid system of claim 9, wherein the jet-mixer comprises:
a housing comprising a mixer port formed in an inner surface of the housing; and
a rotor rotatably disposed in the housing, the rotor comprising a rotor blade;
wherein the rotor comprises a first angular position in the housing restricting fluid flow through the mixer port, and a second angular position allowing fluid flow through the mixer port.

11. The fluid system of claim 10, wherein:
the jet-mixer is configured to inject the first fluid jet through the mixer port into the passage of the fluid conduit in response to rotation of the rotor in the housing; and
the jet-mixer is configured to inject a second fluid jet through the mixer port into the passage of the fluid conduit that has a constant velocity profile when the rotor is held in the second angular position.

12. The fluid system of claim 10, further comprising a fluid energizer coupled between the first conduit and the jet-mixer, wherein the fluid energizer is configured to energize the first fluid flow.

13. The fluid system of claim 12, wherein the fluid energizer comprises a pump configured to pressurize the first fluid flow.

14. The fluid system of claim 13, wherein the pump is configured to increase fluid pressure in the housing of the jet-mixer when the rotor of the jet-mixer is disposed in the first angular position.

15. The fluid system of claim 10, further comprising a motor coupled to the rotor of the jet-mixer, the motor configured to control a rotational speed of the rotor in the housing.

16. The fluid system of claim 9, further comprising a fluid sampler coupled to the first conduit and configured to capture a fluid sample from the first fluid flow.

17. A method for mixing a fluid flow in a fluid conduit, comprising:
providing a first fluid flow to a jet-mixer from a passage of the fluid conduit; and
injecting a fluid jet through a mixer port of the jet-mixer into the passage of the fluid conduit, the fluid jet having a pulsed velocity profile.

18. The method of claim 17, further comprising increasing a rotational speed of a rotor of the jet-mixer to thereby increase a frequency of a velocity cycle of the pulsed velocity profile, the velocity cycle comprising a maximum velocity and a minimum velocity.

19. The method of claim 17, further comprising pressurizing the first fluid flow provided to the jet-mixer using a pump.

20. The method of claim 17, further comprising increasing an output pressure of a pump to thereby increase energy imparted to fluid in the fluid conduit from the fluid jet.

* * * * *